Oct. 11, 1955  G. HAGLUND  2,720,376
METHOD AND APPARATUS FOR THE PRODUCTION OF A
LIQUID MIXTURE OF CONSTANT SPECIFIC WEIGHT
Filed March 2, 1951
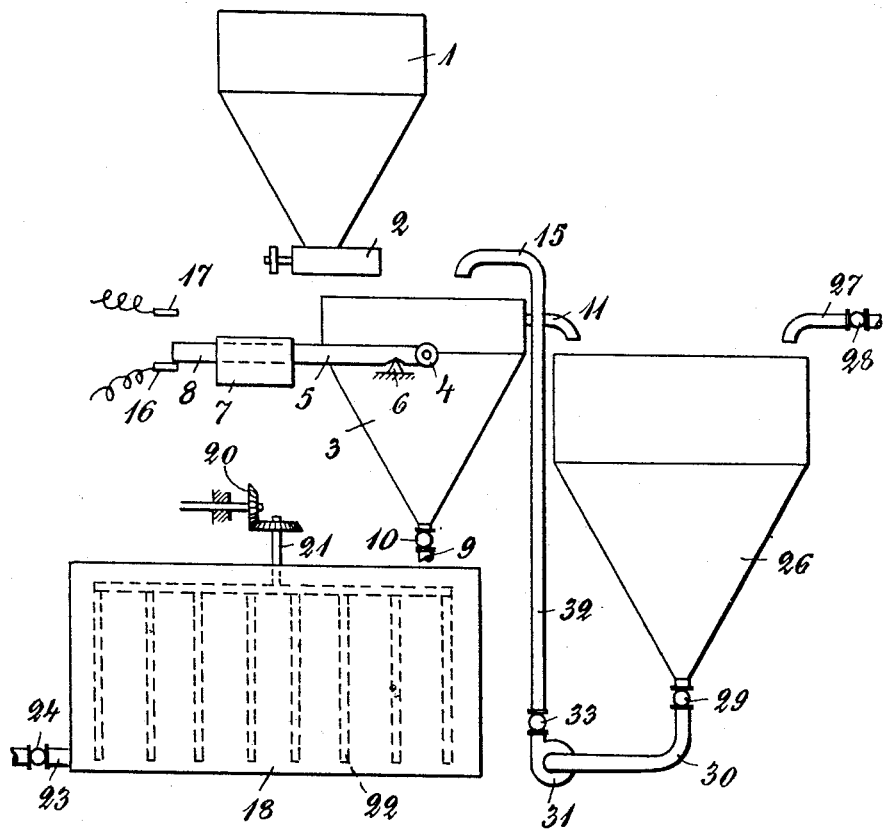
Inventor:
Gustaf Haglund,
By: Pierce, Scheffler & Parker,
Attorneys.

United States Patent Office
2,720,376
Patented Oct. 11, 1955

2,720,376

METHOD AND APPARATUS FOR THE PRODUCTION OF A LIQUID MIXTURE OF CONSTANT SPECIFIC WEIGHT

Gustaf Haglund, Storangen, Sweden, assignor to Aktiebolaget Hedemora Verkstader, Hedemora, Sweden, a company of Sweden Application March 2, 1951, Serial No. 213,516

Claims priority, application Sweden March 8, 1950

6 Claims. (Cl. 249—14)

The present invention relates to improvements in and relating to the production of a mixture of substances, at least one of which is a liquid, having a predetermined substantially constant average specific weight.

In practice it often occurs that a solid is separated from a solution by filtering, settling or in other manner and that a mixture of solid and liquid substances is obtained which, in the course of production, will have a varying specific weight. If it is desirable to use this solid in fixed dosages, it may be subjected to drying with subsequent dosing of the dry material, which is easily accomplished in known manner. In many cases, it is a decided advantage if the material can be dosed without previous drying, both from the standpoint of economy and because the drying may have an undesired chemical or physical influence on the material. In order that a moist material may be dosed it is presupposed that the same can be produced in a dosable state having a constant composition. It also occurs that a solution or mixture of solutions is obtained under such conditions that the specific weight varies when it is desirable to produce a solution or a mixture of solutions having a constant specific weight.

The present invention relates to a method and device enabling the dosing of solid material in liquid mixture without the solid material being dried. The invention is primarily characterized by the fact that a weighing vessel provided with overflow is supplied with the substance mixture having an average specific weight greater than that desired and a diluting liquid having a specific weight lower than that desired, until the weighing vessel overflows and the vessel, together with the contents of the same, has attained a total weight corresponding to the weight of the weighing vessel filled, up to overflow, with a liquid mixture having a desired specific weight.

The invention is best illustrated by an example in connection with a diagrammatic representation according to the accompanying drawing showing a mixing apparatus according to the invention which, however, is not limited to the embodiment thus shown and described.

Into a container or tank 1, which to advantage is conically shaped, there is introduced a substance mixture, for instance, a precipitate of solid material in aqueous mixture of varying composition having a specific weight varying, for example, between 1.43 and 1.17, it being assumed that the specific weight of the solid material is 2.5 and, thus, that it is present in the mixture in a percentage by weight of 50 to 25%. This mixture is assumed to have a specific weight greater than that desired. The specific weights 1.43 and 1.17 are calculated as follows: If the mixture contains 50% of solids by weight, the volume ratio will be 1 volume of solids (2.5 weight) and 2.5 volumes of liquid (2.5 weight). The total volume of the mixture will be 3.5 while the total weight will be 5 and the specific weight will be 1.428+. If the mixture contains 25% of solids by weight the volume ratio will be 1 volume of solids (2.5 weight) to 7.5 volumes of liquid (7.5 weight). The total volume will be 8.5 and the total weight 10 giving a specific weight of 1.176+.

The substance mixture contained in the tank 1 may, by means of an adjustable feeding apparatus 2, be passed to a preferably conically shaped weighing vessel 3, which is supported on pins 4 of a bail 5 carried by balance edges 6 and counter-balanced by a weight 7, which latter is slidable on a projecting arm 8 on the bail 5. By the displacement of the weight 7 the weighing vessel 3 may be outbalanced for different desired weights of the filling contained therein. Thus, the device acts as a balance in which the weighing vessel 3 is one scale pan. In the embodiment shown, the weighing vessel has at its bottom an outlet 9, which is regulated by means of a valve 10, and at the top an overflow 11. Besides the feeding apparatus 2 there is provided an additional delivery device consisting of a pipe 15 for a diluting liquid, usually water, which has a specific weight less than that desired. Thus, the weighing vessel may be charged from both these delivery devices, and in each special case the weight 7 is so adjusted as to be outweighed by the weighing vessel when this latter is filled, up to the overflow, with a liquid mixture having the average specific weight desired. Consequently, if it is assumed that the weighing vessel 3 is filled, for instance, with water or an aqueous mixture, the specific weight of which approaches 1.00, and the heavier substance mixture is allowed to flow into said vessel 3 from the tank 1, said heavier mixture will displace liquid from the weighing vessel, which liquid will run off through the overflow 11 until the filling obtains the weight corresponding to the setting of the weight 7, when the weighing vessel will overbaalnce. The bail arm 8, which has so far been held against a support 16, will then be raised until it engages a stop 17. This movement of the weighing vessel may be utilized for opening the cock 19, which discharges the weighing vessel into a storage tank 18, and for simultaneously closing all inlets to the weighing vessel. When the weighing vessel 3 has been emptied, it is returned to its filling position, the outlet then being shut and the inlets opened. These operations i. e. the closing of the inlet and the opening of the outlet may be performed manually, the movement of the weighing vessel serving merely as a signal for the performance of said operations.

When the weighing vessel 3 is being emptied, its contents have only on an average the intended specific weight, e. g. 1.2, that is, between that of the substance mixture e. g. 1.43 to 1.17 and that of the diluting liquid e. g. 1 as stated above but usualy the contents are not homogeneous. Therefore, the storage tank 18 is preferably equipped with stirring devices making the contents homogeneous, such as the stirring screen 22 rotated by bevel wheels 20 and 21. Through a pipe 23 and a cock 24 a mixture of homogeneous composition having a specific weight of e. g. 1.2 is then drawn off.

Of course, during the filling of the weighing vessel 3 from the tank 1 and through the pipe 15 a certain mixing takes place so that the portion of the liquid which runs off through the overflow 11 will be charged with the valuable heavier substance. Therefore, the effluent is suitably collected and allowed to return as diluting liquid of low specific weight to the weighing vessel. As shown in the drawing, this may be effected by means of a collecting tank 26, which receives the effluent passing out from the outlet 11 and, moreover, has an inlet 27 fitted with a valve 28 for fresh water or the like.

The contents of the tank 26 are passed via a cock 29 through a pipe 30 by means of a pump 31 and further through a pipe 32 to the pipe 15. The liquid level in tank 26 sinks and rises in timed relation with the filling and emptying of the weighing vessel or weighing vessels, and the tank 26 is proportioned with regard thereto. By giving ample measures to the tank 26 the regulation of the flow through the pipe 27 is facilitated.

The same condition as stated above will prevail, in principle, if the tank 1 is charged with liquid solutions of varying specific weight, soluble salts or the like, and similarly solutions of varying characters may be delivered through the pipe 27.

The technical application of the balance principle to the weighing vessel 3 does not only involve upward and downward movements which might appear to be most natural, whether the outweighing takes place according to the balancing scales principle or the spring balance principle or some other balance principle. A balancing such that the weighing vessel is capable of a tilting motion limited in the lateral direction, is often the technically best performance, at least for automatic weighing vessels with continuously acting filling means and acting in pairs fixedly coupled to each other.

Of course, the means stated above may be replaced by equivalent arrangements. Thus, the overflow 11 may be replaced or completed by a suction pipe acting on a desired level.

In order to state a material for which the invention may advantageously come into use, the so-called "mesa," a lime sludge obtained as a by-product in the production of sodium cellulose according to the sulphate method, may be mentioned.

What is claimed is:

1. A device for producing a liquid mixture having a substantially constant and desired specific weight from a substance mixture of varying specific weights the average of which weights is greater than said desired specific weight by mixing said substance mixture with a diluting liquid of lower specific weight than said desired specific weight, comprising a weighing vessel having a first discharge opening adjacent the top and a second discharge opening adjacent the bottom thereof, a support yielding to a given minimum load, said vessel being mounted on said support, a valve in said second discharge opening, a conduit for the supply of the substance mixture, and a separate conduit for the supply of the diluting liquid, the openings of said conduits being positioned to discharge into said vessel whereby said valve may be opened to discharge the contents of said vessel having said desired specific weight when said support yields.

2. A device as claimed in claim 1, further comprising a storage tank, said conduit for the supply of diluting liquid being connected to said tank, means for passing liquid contained in said tank through said conduit and a passageway connecting said first discharge opening to the interior of said tank.

3. A device as claimed in claim 1, comprising electrical contacts positioned to be engaged by said support to actuate said valve.

4. A device as claimed in claim 1, further comprising means for controlling the supply through said conduit for the supply of substance mixture, means for controlling the supply through said conduit for the supply of diluting liquid, and means associated with said support for actuating said means.

5. A method of producing a liquid mixture having a substantially constant desired specific weight from a substance mixture of varying greater specific weights by mixing said substance mixture with a diluting liquid of lower specific weight than said desired specific weight, comprising delivering said diluting liquid and said substance mixture separately to a container so as completely to fill said container with a liquid mixture which is poorer in substance mixture in the upper region of said container than in the lower region thereof, the supply of said diluting liquid and substance mixture being controlled so that the total weight of said liquid mixture filling said container is less than the weight of an equal volume of liquid mixture of the desired specific weight, supplying further substance mixture to said container so that liquid mixture poor in substance mixture will overflow from said container and be removed from said upper region until the total weight of the liquid mixture filling said container has attained said weight of an equal volume of liquid mixture of said desired specific weight, and withdrawing said liquid mixture from the container separately from said overflow.

6. A method as defined in claim 5 in which overflow from said container is returned thereto as diluting liquid.

References Cited in the file of this patent

UNITED STATES PATENTS

| | | |
|---|---|---|
| 1,297,595 | Riley | Mar. 18, 1919 |
| 1,874,349 | Read | Aug. 30, 1932 |
| 2,046,693 | McCrery | July 7, 1936 |
| 2,332,953 | Tromp | Oct. 26, 1943 |
| 2,343,000 | Carliss | Feb. 20, 1944 |
| 2,421,708 | McKinnis | June 3, 1947 |
| 2,505,491 | Harper | Apr. 25, 1950 |
| 2,550,050 | Emerson | Apr. 24, 1951 |
| 2,622,766 | Simon | Dec. 23, 1952 |